(12) United States Patent
You

(10) Patent No.: US 11,636,113 B2
(45) Date of Patent: Apr. 25, 2023

(54) METHOD FOR PERFORMING MULTI-CACHING ON DATA SOURCES OF SAME TYPE AND DIFFERENT TYPES BY USING CLUSTER-BASED PROCESSING SYSTEM AND DEVICE USING THE SAME

(71) Applicant: Seculayer Co., Ltd., Seoul (KR)

(72) Inventor: Jin Sang You, Gyeonggi-do (KR)

(73) Assignee: SECULAYER CO., LTD., Seoul (KR)

( * ) Notice: Subject to any disclaimer, the term of this patent is extended or adjusted under 35 U.S.C. 154(b) by 31 days.

(21) Appl. No.: 17/069,027

(22) Filed: Oct. 13, 2020

(65) Prior Publication Data

US 2022/0043821 A1 Feb. 10, 2022

(30) Foreign Application Priority Data

Aug. 6, 2020 (KR) .......................... 10-2020-0098450

(51) Int. Cl.
*G06F 16/24* (2019.01)
*G06F 16/28* (2019.01)
*G06F 16/2455* (2019.01)
*G06F 16/2458* (2019.01)
*G06F 16/2453* (2019.01)
*G06F 16/248* (2019.01)

(52) U.S. Cl.
CPC .... *G06F 16/24552* (2019.01); *G06F 16/2465* (2019.01); *G06F 16/24544* (2019.01); *G06F 16/285* (2019.01); *G06F 16/248* (2019.01)

(58) Field of Classification Search
USPC ........................................................ 707/718
See application file for complete search history.

(56) References Cited

U.S. PATENT DOCUMENTS

| 6,073,129 | A  | * | 6/2000 | Levine | ............. | G06F 16/24524 |
| 6,601,062 | B1 | * | 7/2003 | Deshpande | ....... | G06F 16/24539 |
| 7,689,602 | B1 | * | 3/2010 | Sim-Tang | ........... | G06F 16/2246 |
| | | | | | | 707/673 |
| 8,713,077 | B2 | * | 4/2014 | Kazar | .................... | G06F 3/067 |
| | | | | | | 707/812 |
| 8,949,455 | B2 | * | 2/2015 | Idicula | .................. | G06F 16/972 |
| | | | | | | 709/238 |
| 9,195,599 | B2 | * | 11/2015 | Barber | ...................... | G06F 9/50 |
| 9,847,907 | B2 | | 12/2017 | Shankaran et al. | | |
| 11,461,304 | B2 | * | 10/2022 | Brewster | ............. | G06F 16/2379 |

(Continued)

FOREIGN PATENT DOCUMENTS

KR 10 2009 0014259 2/2009
KR 10 2010 0106348 10/2010

*Primary Examiner* — Amy Ng
*Assistant Examiner* — Raheem Hoffler
(74) *Attorney, Agent, or Firm* — Xsensus LLP

(57) ABSTRACT

A method for performing multi-caching on data sources of a same type and different types by using a cluster-based processing system is provided. The method includes steps of: a big data cluster management device (a) determining whether a result set, corresponding to a query result, is present as first cache data in master or worker nodes, (b) if specific part of the result set is absent, (i) establishing an execution plan (ii) acquiring a first subset in the master or the worker nodes, (iii) acquiring a second subset in none of the master and the worker nodes, and (iv) applying joint operation thereto, and (c) applying data processing operation and output operation thereto thus acquiring the result set as the query result.

8 Claims, 3 Drawing Sheets

(56) References Cited

U.S. PATENT DOCUMENTS

| | | | |
|---|---|---|---|
| 2002/0107935 A1* | 8/2002 | Lowery | G06F 16/9574 |
| | | | 707/E17.12 |
| 2008/0222159 A1* | 9/2008 | Aranha | G06F 16/21 |
| 2009/0313438 A1* | 12/2009 | Krishnaprasad | G06F 12/0813 |
| | | | 711/E12.017 |
| 2012/0150819 A1* | 6/2012 | Lindahl | G06F 16/285 |
| | | | 707/687 |
| 2016/0026667 A1* | 1/2016 | Mukherjee | G06F 16/278 |
| | | | 707/714 |
| 2016/0188594 A1* | 6/2016 | Ranganathan | G06F 16/24552 |
| | | | 707/769 |
| 2018/0181491 A1* | 6/2018 | DeLaurier | G06F 12/0895 |
| 2019/0146970 A1* | 5/2019 | Chamieh | G06F 16/284 |
| | | | 707/718 |
| 2019/0179755 A1* | 6/2019 | Mudumbai | G06F 12/0831 |
| 2021/0089550 A1* | 3/2021 | Karl | G06F 16/24552 |

\* cited by examiner

METHOD FOR PERFORMING MULTI-CACHING ON DATA SOURCES OF SAME TYPE AND DIFFERENT TYPES BY USING CLUSTER-BASED PROCESSING SYSTEM AND DEVICE USING THE SAME

FIELD OF THE DISCLOSURE

The present disclosure relates to a method for performing multi-caching on data sources of a same type and different types using a cluster-based processing system and a device using the same.

BACKGROUND OF THE DISCLOSURE

As IT/OT technologies have developed, the amount of data being collected is increasing exponentially, and accordingly, researches on creating additional values using big data are being conducted. Accordingly, technologies and tools for handling the big data are also being developed, and among them, big data analysis systems, such as, Apache Solr, Elastic search, etc., which are provided as open sources, are attracting attentions.

Herein, the Apache Solr and the Elastic search are built on a basis of the search engine Lucene. To be specific, the Apache Solr and the Elastic search are specialized in certain functions, such as, searching and storing functions for index-based data or a simple statistical analysis function, however, the Apache Solr and the Elastic search are limited in other functions, such as, modification of the searched data, analysis and aggregation of two or more data sets, etc.

In addition, even in the case of an RDB (relational database) that processes queries related to two or more data sets using a query language such as SQL (structured query language), its performance is limited to a single data source, so it does not support the analysis among the data sets in data sources of different types.

For this reason, at present, when the analysis among the data sources of the different types is required, a separate application for the analysis should be implemented each time, or the data sets in the data sources of the different types should be extracted, transformed and loaded into the single data source. However, such procedures have a limitation that resources are wasted during data duplication processes and that processing the data takes a lot of time.

To solve this problem, the inventor of the present disclosure proposes a method for performing multi-caching on the data sources of the same type and the different types by using a cluster-based processing system.

SUMMARY OF THE DISCLOSURE

It is an object of the present disclosure to solve all the aforementioned problems.

It is another object of the present disclosure to provide a method for performing multi-caching on data sources of a same type and different types by using a cluster-based processing system.

It is still another object of the present disclosure to provide the method for analysis among the data sources of the different types without moving data sets of the data sources of the different types into a single database.

In order to accomplish objects above and characteristic effects to be described later of the present disclosure, distinctive structures of the present disclosure are described as follows.

In accordance with one aspect of the present disclosure, there is provided a method for performing multi-caching on data sources of a same type and different types by using a cluster-based processing system, including steps of: (a) if a user query is acquired, a big data cluster management device performing or supporting another device to perform a process of determining whether a result set, corresponding to a query result of the user query, is present as first cache data in at least one master node or at least one worker node, wherein the worker node is included in a same system with the master node and communicates with the master node; (b) the big data cluster management device performing or supporting another device to perform: if at least specific part of the result set is determined as present in none of the master node and the worker node, (i) a process of establishing an execution plan to sequentially execute a search operation, a data processing operation, and an output operation based on a result of parsing the user query, (ii) a process of acquiring a first subset, determined as present as second cache data in the master node or the worker node, by allowing the master node or the worker node to execute the search operation according to the execution plan, wherein the second cache data represents elemental sets included in the result set, (iii) a process of acquiring a second subset, determined as present in none of the master node and the worker node, from the second cache data by allowing at least one external data source to execute the search operation according to the execution plan, and (iv) a process of applying at least part of a joint operation included in the search operation to the first subset and the second subset according to the execution plan, to thereby acquire a result of the search operation, wherein the joint operation includes at least part of a JOIN operation and a UNION operation; and (c) the big data cluster management device performing or supporting another device to perform a process of applying the data processing operation and the output operation to the result of the search operation according to the execution plan, to thereby acquire and output the result set as the query result.

As one example, at the process of (iii) in the step of (b), if a first data set to an n-th data set, to which at least part of the joint operation is to be applied, are determined as present in the master node or the worker node, the big data cluster management device performs or supports another device to perform a process of allowing the master node or the worker node to apply the joint operation to the first data set to the n-th data set, to thereby acquire the first subset.

As one example, the big data cluster management device performs or supports another device to perform a process of updating the second cache data such that the second cache data include the first subset.

As one example, at the processes of (iii) and (iv) in the step of (b), if at least part of a first data set to an n-th data set, to which at least part of the joint operation is to be applied, is determined as present in none of the master node and the worker node, the big data cluster management device performs or supports another device to perform: (i) a process of allowing the master node or the worker node to execute the search operation according to the execution plan, to thereby acquire at least one specific data set among the first data set to the n-th data set, wherein the specific data set is determined as present in the master node or the worker node, (ii) a process of allowing the external data source to execute the search operation according to the execution plan, to thereby acquire a remaining data set among the first data set to the n-th data set, wherein the remaining data set is determined as present in none of the master node and the worker node, and (iii) a process of allowing the master node to apply the joint operation to the specific data set and the remaining data set, to thereby acquire the second subset.

As one example, the big data cluster management device performs or supports another device to perform a process of updating the second cache data such that the second cache data include the remaining data set and the second subset.

As one example, at the process of (iv) in the step of (b), the big data cluster management device performs or supports another device to perform a process of updating the second cache data such that the second cache data include the second subset.

As one example, the big data cluster management device performs or supports another device to perform a process of executing the search operation and the data processing operation in a file-based manner.

As one example, at the step of (c), the data processing operation includes at least one of an aggregating operation, a data transforming operation, a filtering operation, a sorting operation, and a data truncating operation.

As one example, at the step of (c), the big data cluster management device performs or supports another device to perform a process of updating the first cache data such that the first cache data include the query result.

As one example, at the step of (c), the output operation includes at least one of a screen displaying operation, a remote RDB (relational database) storing operation, and a file storing operation.

In accordance with another aspect of the present disclosure, there is provided a big data cluster management device for performing multi-caching on data sources of a same type and different types by using a cluster-based processing system, including: at least one memory that stores instructions; and at least one processor configured to execute the instructions to perform or support another device to perform: (I) if a user query is acquired, a process of determining whether a result set, corresponding to a query result of the user query, is present as first cache data in at least one master node or at least one worker node, wherein the worker node is included in a same system with the master node and communicates with the master node, (II) if at least specific part of the result set is determined as present in none of the master node and the worker node, (i) a process of establishing an execution plan to sequentially execute a search operation, a data processing operation, and an output operation based on a result of parsing the user query, (ii) a process of acquiring a first subset, determined as present as second cache data in the master node or the worker node, by allowing the master node or the worker node to execute the search operation according to the execution plan, wherein the second cache data represents elemental sets included in the result set, (iii) a process of acquiring a second subset, determined as present in none of the master node and the worker node, from the second cache data by allowing at least one external data source to execute the search operation according to the execution plan, and (iv) a process of applying at least part of a joint operation included in the search operation to the first subset and the second subset according to the execution plan, to thereby acquire a result of the search operation, wherein the joint operation includes at least part of a JOIN operation and a UNION operation, and (III) a process of applying the data processing operation and the output operation to the result of the search operation according to the execution plan, to thereby acquire and output the result set as the query result.

As one example, at the process of (iii) in the process of (II), if a first data set to an n-th data set, to which at least part of the joint operation is to be applied, are determined as present in the master node or the worker node, the processor performs or supports another device to perform a process of allowing the master node or the worker node to apply the joint operation to the first data set to the n-th data set, to thereby acquire the first subset.

As one example, the processor performs or supports another device to perform a process of updating the second cache data such that the second cache data include the first subset.

As one example, at the processes of (iii) and (iv) in the process of (II), if at least part of a first data set to an n-th data set, to which at least part of the joint operation is to be applied, is determined as present in none of the master node and the worker node, the processor performs or supports another device to perform: (i) a process of allowing the master node or the worker node to execute the search operation according to the execution plan, to thereby acquire at least one specific data set among the first data set to the n-th data set, wherein the specific data set is determined as present in the master node or the worker node, (ii) a process of allowing the external data source to execute the search operation according to the execution plan, to thereby acquire a remaining data set among the first data set to the n-th data set, wherein the remaining data set is determined as present in none of the master node and the worker node, and (iii) a process of allowing the master node to apply the joint operation to the specific data set and the remaining data set, to thereby acquire the second subset.

As one example, the processor performs or supports another device to perform a process of updating the second cache data such that the second cache data include the remaining data set and the second subset.

As one example, at the process of (iv) in the process of (II), the processor performs or supports another device to perform a process of updating the second cache data such that the second cache data include the second subset.

As one example, the processor performs or supports another device to perform a process of executing the search operation and the data processing operation in a file-based manner.

As one example, at the process of (III), the data processing operation includes at least one of an aggregating operation, a data transforming operation, a filtering operation, a sorting operation, and a data truncating operation.

As one example, at the process of (III), the processor performs or supports another device to perform a process of updating the first cache data such that the first cache data include the query result.

As one example, at the process of (III), the output operation includes at least one of a screen displaying operation, a remote RDB (relational database) storing operation, and a file storing operation.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
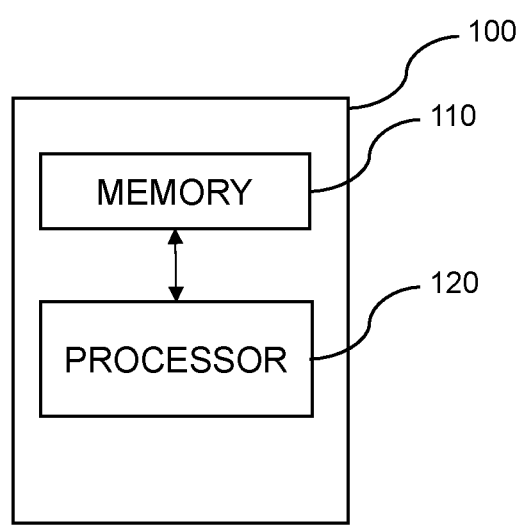
FIG. 1 is a drawing schematically illustrating a big data cluster management device for performing multi-caching on data sources of a same type and different types by using a cluster-based processing system in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

The headings and abstract of the present disclosure provided herein are for convenience only and do not limit or interpret the scope or meaning of the embodiments.

To allow those skilled in the art to carry out the present disclosure easily, the example embodiments of the present disclosure will be explained in detail by referring to attached diagrams as shown below.

FIG. 1 is a drawing schematically illustrating a big data cluster management device for performing multi-caching on data sources of a same type and different types by using a cluster-based processing system in accordance with one example embodiment of the present disclosure. By referring to FIG. 1, the big data cluster management device 100 may include a memory 110 for storing instructions to acquire a user query of a user and output a query result of the user query, and a processor 120 for performing processes of acquiring the user query and outputting the query result, according to the instructions in the memory 110.

Specifically, the big data cluster management device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS (operating system) and software configuration of applications that achieve specific purposes.

Such description of the computing device does not exclude an integrated device including any combination of a processor, a memory, a medium, or any other computing components for implementing the present disclosure.

Figure 2:
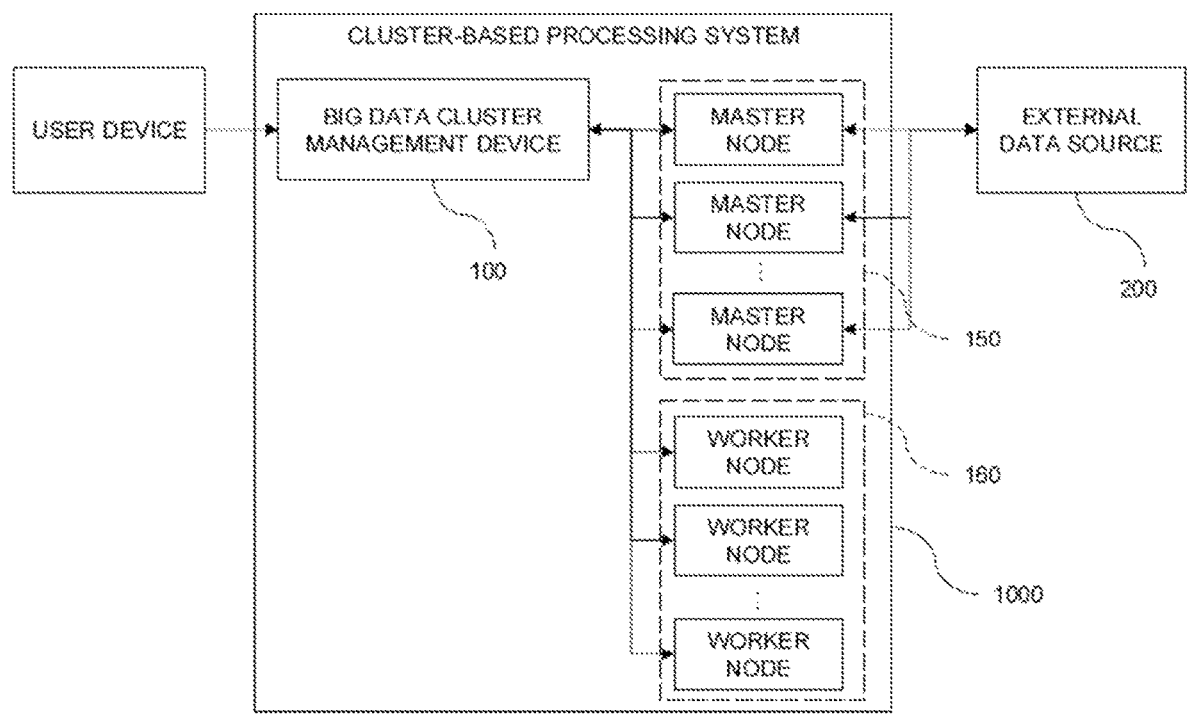
FIG. 2 is a drawing schematically illustrating a configuration of the cluster-based processing system in accordance with one example embodiment of the present disclosure.

A configuration and functions of the cluster-based processing system including the big data cluster management device 100 in accordance with one example embodiment of the present disclosure are described by referring to FIG. 2.

FIG. 2 is a drawing schematically illustrating a configuration of the cluster-based processing system 1000 including the big data cluster management device 100 in accordance with one example embodiment of the present disclosure.

Herein, the cluster-based processing system 1000 may be connected with at least one external data source 200, and may include the big data cluster management device 100, one or more master nodes 150, and one or more worker nodes 160.

In detail, a user device for acquiring the user query may allow access to the big data cluster management device 100 included in the cluster-based processing system 1000. Also, the external data source 200 may be connected with the master nodes 150 included in the cluster-based processing system 1000. Further, the big data cluster management device 100 may be connected with each of the master nodes 150 and the worker nodes 160.

Herein, the big data cluster management device 100 may perform or support another device to perform (i) a process of acquiring the user query from the user device and (ii) a process of allowing execution of operations included in the user query on data and/or cache data stored in the master nodes 150, the worker nodes 160, and the external data source 200. Further, the cache data may include (1) first cache data among which a result set, corresponding to a query result of the user query per se, may or may not be included and (2) and second cache data merely representing elemental sets included in the result set. Also, the big data cluster management device 100 may be configured as independent of the master nodes 150, but the scope of the present disclosure is not limited thereto, and the big data cluster management device 100 may include the master nodes 150.

Meanwhile, the master nodes 150 may be connected with the external data source 200 and the worker nodes 160 directly or indirectly. Also, the master nodes 150 may store the first cache data and the second cache data, and may execute the operations included in the user query on the data and/or the cache data stored in the master nodes 150, the worker nodes 160, and the external data source 200. Herein, the worker nodes 160 may include the cache data, i.e., the first cache data and/or the second cache data. Also, the cluster-based processing system 1000 may be configured to include two or more of the master nodes 150 so that structural redundancy of the master nodes 150 is established.

Meanwhile, the worker nodes 160 may store the first cache data and the second cache data, and may execute the operations included in the user query on the cache data stored in the worker nodes 160. Herein, the cache data may include the first cache data and/or the second cache data. Also, the cluster-based processing system 1000 may include two or more of the worker nodes 160 so that a cluster comprised of the worker nodes 160 is implemented.

Figure 3:
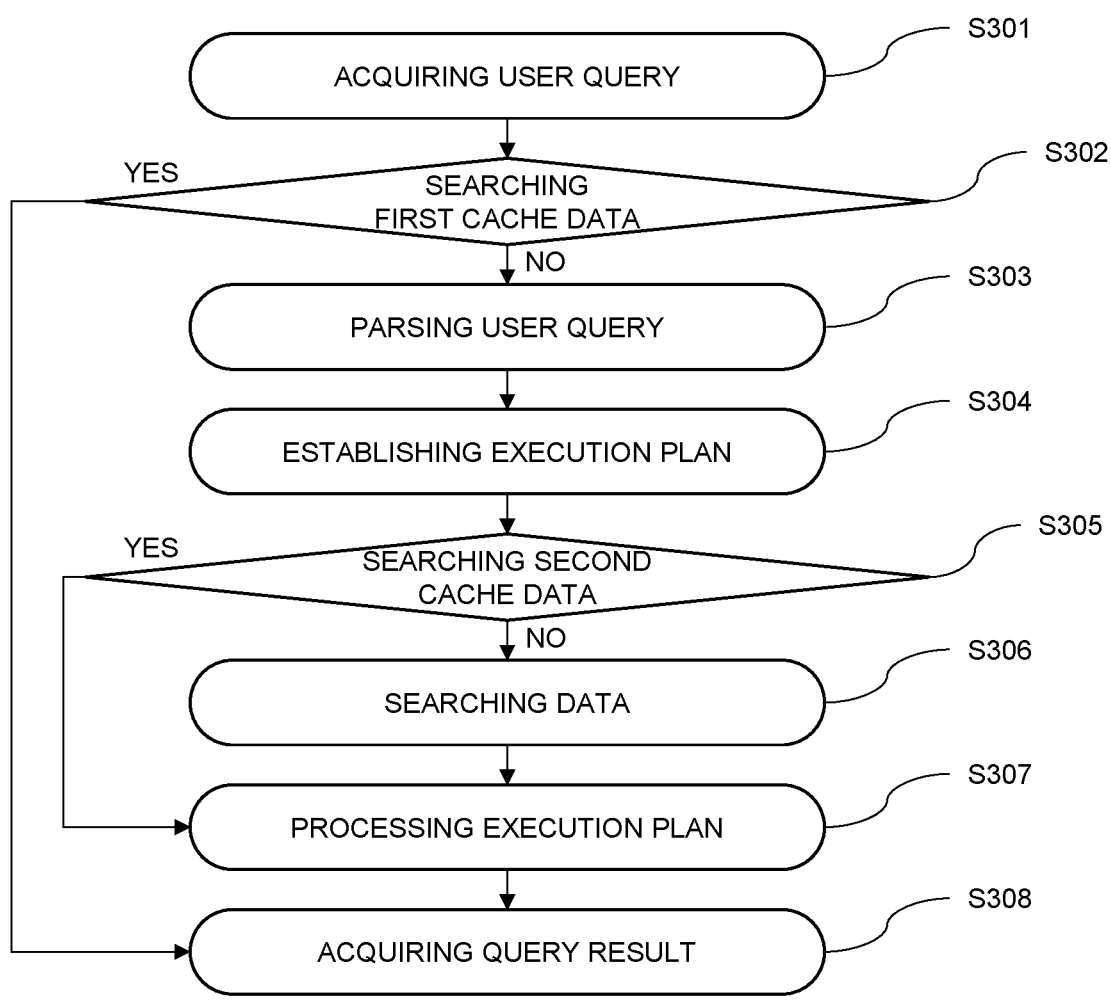
FIG. 3 is a drawing schematically illustrating processes of performing the multi-caching on the data sources of the same type and the different types by using the cluster-based processing system in accordance with one example embodiment of the present disclosure.

The configuration and the functions of the cluster-based processing system 1000 are described as above. Processes of performing the multi-caching on the data sources of the same type and the different types by using the cluster-based processing system 1000 are described by referring to FIG. 3 as follows.

First, if the user query is acquired at a step of S301, the big data cluster management device 100 may perform or support another device to perform a process of determining whether the result set, corresponding to the query result, is present as the first cache data in at least one of the master nodes 150 or at least one of the worker nodes 160 at a step of S302. Herein, the user query may be parsed for the purpose of determining whether the result set is present as the first cache data in at least one of the master nodes 150 and/or at least one of the worker nodes 160.

If the result set is determined as present as the first cache data in at least one of the master nodes 150 or at least one of the worker nodes 160, then the big data cluster management device 100 may skip the steps from S303 to S307, and may acquire the result set from the first cache data as the query result.

If at least specific part of the result set is determined as present in none of the master nodes 150 and the worker nodes 160, then the big data cluster management device 100 may perform or support another device to perform (i) a process of parsing the user query at a step of S303 and (ii) a process of establishing an execution plan to execute the user query based on a result of parsing the user query at a step of S304.

Herein, the execution plan may be established to sequentially execute a search operation, a data processing operation, and an output operation, included in the user query.

Then, the big data cluster management device 100 may perform or support another device to perform a process of acquiring a first subset determined as present as second cache data in the master nodes 150 or the worker nodes 160 by allowing the master nodes 150 or the worker nodes 160 to execute the search operation according to the execution plan, at a step of S305. Herein, the second cache data may represent the elemental sets included in the result set.

If a first data set to an n-th data set, to which at least part of a joint operation included in the execution plan is to be applied, is determined as present as the first subset in the master nodes 150 or the worker nodes 160, then the big data cluster management device 100 may perform or support another device to perform a process of allowing the master nodes 150 or the worker nodes 160 to apply the joint operation to the first data set to the n-th data set, to thereby acquire the first subset, instead of acquiring the first data set to the n-th data set as a whole as the first subset. Herein, the joint operation may include at least part of a JOIN operation and a UNION operation. Also, the big data cluster management device 100 may perform or support another device to perform a process of updating the second cache data such that the second cache data include the first subset.

Then, the big data cluster management device 100 may perform or support another device to perform a process of acquiring a second subset by allowing the external data source 200 to execute the search operation according to the execution plan, at a step of S306. Herein, the second cache data may be comprised of the first subset and the second subset. And also, the first subset can be acquired from the master nodes 150 and the worker nodes 160. Further, the second subset cannot be acquired from the master nodes 150 and the worker nodes 160, that is, the second subset cannot be acquired by applying the joint operation to the first subset and may be acquired from the external data source.

Herein, if at least part of the first data set to the n-th data set, required for acquiring the second subset, is determined as present in the master nodes 150 and/or the worker nodes 160, then the big data cluster management device 100 may perform or support another device to perform (i) a process of allowing the master nodes 150 and/or the worker nodes 160 to execute the search operation according to the execution plan, to thereby acquire at least one specific data set among the first data set to the n-th data set and (ii) a process of allowing the external data source 200 to execute the search operation according to the execution plan, to thereby acquire a remaining data set among the first data set to the n-th data set, where the remaining data set is determined as present in none of the master nodes 150 and the worker nodes 160. Then the big data cluster management device 100 may perform or support another device to perform a process of applying the joint operation to the specific data set and the remaining data set, to thereby acquire the second subset. Herein, the big data cluster management device 100 may perform or support another device to perform a process of updating the second cache data such that the second cache data include the remaining data set and the second subset.

Then, the big data cluster management device 100 may perform or support another device to perform (i) a process of applying at least part of the joint operation, included in the search operation, to the first subset and the second subset according to the execution plan, to thereby acquire a result of the search operation, and (ii) a process of applying the data processing operation and the output operation to the result of the search operation according to the execution plan, to thereby acquire and output the result set as the query result, at steps of S307 and S308.

Herein, the big data cluster management device 100 may perform or support another device to perform a process of applying the data processing operation and the output operation in a file-based manner, that is, in an on-disk manner instead of an in-memory manner, to thereby prevent problems due to lack of memory during big data analysis.

Also, the data processing operation may include at least one of an aggregating operation, a data transforming operation, a filtering operation, a sorting operation, and a data truncating operation, but the scope of the present disclosure is not limited thereto. Further, the output operation may include at least one of a screen displaying operation, a remote RDB (relational database) storing operation, and a file storing operation, but the scope of the present disclosure is not limited thereto.

Also, the big data cluster management device 100 may perform or support another device to perform a process of updating the first cache data such that the first cache data include the query result.

The present disclosure has an effect of providing a method for multi-caching on the data sources of the same type and the different types using the cluster-based processing system.

The present disclosure has another effect of providing a method for analysis among the data sources of the different types without moving data sets of the data sources of the different types into a single database.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the spirit of the present disclosure must not be confined to the explained embodiments, and the following patent claims as well as everything including variations equal or equivalent to the patent claims pertain to the category of the spirit of the present disclosure.

What is claimed is:

1. A method for performing multi-caching on data sources of different types by using a cluster-based processing system connected to an external data source, the cluster-based processing system including at least one master node and at least one worker node, the method performed by a data cluster management device of the cluster-based processing system and comprising:
    acquiring a user query that comprises a plurality of query elements;
    determining whether or not a complete response to the plurality of query elements pre-exists as joined data within a first cache of either the master node or the worker node;
    upon determining that a complete response to the user query does not pre-exist as joined data within the first cache of either the master node or the worker node, parsing the user query into the plurality of query elements;
    determining whether or not individual responses to each the plurality of query elements exists as individual data elements within a second cache of either the master node or the worker node, thereby producing a determination result;
    the determination result indicating that:
        first joinable data corresponding to a first subset of the plurality of query elements exists as individual data elements within the second cache of either the master node or the worker node,
        first unjoined data corresponding to a second subset of the plurality of query elements exists as an individual data element within the second cache of either the master node or the worker node, and
        second unjoined data corresponding to the second subset of the plurality of query elements does not exist within the second cache of either the master node or the worker node;
    based on determining that the second unjoined data corresponding to the second subset of the plurality of query elements does not exist within the second cache of either the master node or the worker node, determining that the second unjoined data corresponding to the second subset of the plurality of query elements does exist as an individual data element within the external data source;
    performing a series of JOIN operations to create the complete response to the plurality of query elements, the JOIN operations comprising:
        joining the first joinable data to form first joined data,
        joining the first unjoined data within the second cache of either the master node or the worker node and second unjoined data within the external data source to form second joined data, and
        joining the first joined data with the second joined data to produce the complete response to the plurality of query elements; and
    reporting the complete response to the plurality of query elements as a reply to the user query.

2. The method of claim 1, further comprising:
    copying the second unjoined data within the external data source to the second cache of either the master node or the worker node.

3. The method of claim 1, wherein the first subset of the plurality of query elements corresponds to a first type of data and the second subset of the plurality of query elements corresponds to a second type of data different from the first type of data.

4. The method of claim 1, further comprising:
    updating the first cache data such that the first cache data includes the complete response to the plurality of query elements acquired from joining the first joined data with the second joined data.

5. A cluster management device for performing multi-caching on data sources of different types by using a cluster-based processing system connected to an external data source, the cluster-based processing system including a master node and a worker node, the cluster management device comprising:
    at least one memory that stores instructions; and
    at least one processor configured to execute the instructions to perform or support another device to perform a process comprising:
    acquiring a user query that comprises a plurality of query elements;
    determining whether or not a complete response to the plurality of query elements pre-exists as joined data within a first cache of either the master node or the worker node;
    upon determining that a complete response to the user query does not pre-exist as joined data within the first cache of either the master node or the worker node, parsing the user query into the plurality of query elements;
    determining whether or not individual responses to each the plurality of query elements exists as individual data elements within a second cache of either the master node or the worker node, thereby producing a determination result;

the determination result indicating that:
first joinable data corresponding to a first subset of the plurality of query elements exists as individual data elements within the second cache of either the master node or the worker node, first unjoined data corresponding to a second subset of the plurality of query elements exists as an individual data element within the second cache of either the master node or the worker node, and second unjoined data corresponding to the second subset of the plurality of query elements does not exist within the second cache of either the master node or the worker node;

based on determining that the second unjoined data corresponding to the second subset of the plurality of query elements does not exist within the second cache of either the master node or the worker node, determining that the second unjoined data corresponding to the second subset of the plurality of query elements does exist as an individual data element within the external data source;

performing a series of JOIN operations to create the complete response to the plurality of query elements, the JOIN operations comprising:
joining the first joinable data to form first joined data,
joining the first unjoined data within the second cache of either the master node or the worker node and second unjoined data within the external data source to form second joined data, and
joining the first joined data with the second joined data to produce the complete response to the plurality of query elements; and reporting the complete response to the plurality of query elements as a reply to the user query.

6. The cluster management device of claim 5, wherein the process further comprises:
copying the second unjoined data within the external data source to the second cache of either the master node or the worker node.

7. The cluster management device of claim 5, wherein the first subset of the plurality of query elements corresponds to a first type of data and the second subset of the plurality of query elements corresponds to a second type of data different from the first type of data.

8. The cluster management device of claim 5, wherein the process further comprises:
updating the first cache data such that the first cache data includes the complete response to the plurality of query elements acquired from joining the first joined data with the second joined data.

* * * * *